Jan. 19, 1971 T. O. PAINE, DEPUTY 3,555,898
ADMINISTRATOR OF THE NATIONAL AERONAUTICS
AND SPACE ADMINISTRATION
GAS LOW PRESSURE LOW FLOW RATE METERING SYSTEM
Filed Sept. 30, 1968 2 Sheets-Sheet 1

ROBERT T. McDONALD
ROBERT J. FAGOT
JAMES A. ROMAN
INVENTORS

BY J. H. Warden

ATTORNEYS

Jan. 19, 1971        T. O. PAINE, DEPUTY       3,555,898
ADMINISTRATOR OF THE NATIONAL AERONAUTICS
AND SPACE ADMINISTRATION
GAS LOW PRESSURE LOW FLOW RATE METERING SYSTEM
Filed Sept. 30, 1968                                 2 Sheets-Sheet 2
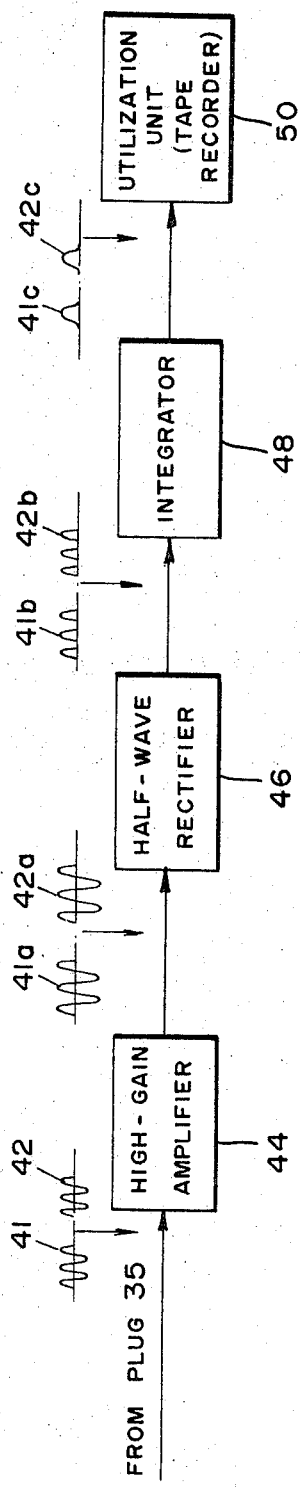
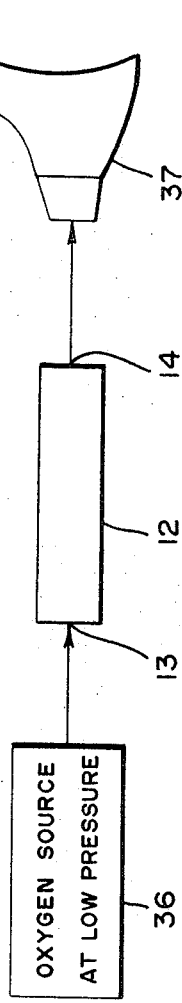
ROBERT T. McDONALD
ROBERT J. FAGOT
JAMES A. ROMAN
*INVENTORS*
BY
ATTORNEYS

United States Patent Office 3,555,898
Patented Jan. 19, 1971

3,555,898
GAS LOW PRESSURE LOW FLOW RATE METERING SYSTEM
T. O. Paine, Deputy Administrator of the National Aeronautics and Space Administration, with respect to an invention of Robert T. McDonald and Robert J. Fagot, both of Los Angeles, Calif., and James A. Roman, Vancouver, Wash.
Filed Sept. 30, 1968, Ser. No. 763,729
Int. Cl. G01f 1/00
U.S. Cl. 73—194
8 Claims

ABSTRACT OF THE DISCLOSURE

A gas low pressure, low flow rate meter finding particular application in respiration rate studies, is disclosed. It includes a tubular member connected in the path of air or oxygen, supplied to a user from an appropriate source. An exciter wire is located in the tubular member. As each burst of air or oxygen, inhaled by the user, first passes through the tubular member, turbulence is produced about the exciter wire resulting in an acoustic signal or tone. The tone propagates through an acoustic tube to a microphone which is located outside the tubular member. The microphone produces an electrical signal which is conditioned prior to being recorded or displayed.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION (1) Field of the invention

This invention generally relates to a flowmeter and, more particularly, to an apparatus for sensing the flow of fluid at low rate and pressure, of the type useful for respiration rate studies.

(2) Description of the prior art

Many flow sensing devices, often referred to as flowmeters or flow sensors, are known in the art. Some are of the mechanical type, incorporating rotating components, while others are based on non-mechanical principles, such as electrical and thermal phenomena, to produce an output which is related to the flow of liquid or gas. Most prior art flowmeters are designed to measure the flow of fluid at high pressure and/or at high flow rates. In many applications, however, a need exists for a reliable sensor to sense the flow of fluid at very low pressure and/or flow rate. For example, such a requirement exists in the study of respiratory rates of pilots in an aircraft with a low-pressure breathing oxygen supply. For such a study, a need exists for a flowmeter which is particularly sensitive to very low gas flow rates, for example 0.5 liter per second.

In the past, several different instrumentation techniques have been used in implementing low flow rate meters för respiration rate studies. However, such devices are characterized by one or more of the following disadvantages. A meter, in which a cheststrap technique is used, is very simple. However, due to its excessive sensitivity it can't be used when the subject is in motion. Also its output is not indicative of flow or flow rate but is directly related to respiration if chest movement is limited only to breathing. A thermistor-incorporating meter consumes a significant amount of power and, therefore, can't be used where power consumption must be minimized. Attempts to reduce power consumption by lowering the thermistor temperature have not been successful, since such a thermistor becomes too sensitive to variations in the temperature of the gas, whose flow rate is to be measured. Thus, a need exists for a new meter or apparatus, capable of sensing gas flow at low rates, which is not limited by the disadvantages, characterizing similar, prior art meters.

OBJECTS AND SUMMARY OF THE INVENTION

A primary object of the present invention is to provide a new improved fluid flow rate meter.

Another object of the invention is to provide a relatively simple and reliable meter to sense low flow rates of a fluid.

A further object of the invention is the provision of an accurate low power consumption meter to record the flow of gas at a low rate and at low pressure.

Still a further object of the invention is to provide a simple, reliable respiration rate meter, which is characterized by low power consumption and satisfactory operation in a cockpit environment.

These and other objects of the invention are achieved by providing a meter which includes a conduit, connected in the path of the fluid whose flow rate is to be measured or sensed. The conduit is connected in series between a fluid supply source and the device or system to which the fluid is to be supplied. When used to measure or sense respiration rate, the fluid supply source is a source of air or oxygen which is supplied to a subject, for example, a pilot, whose rate of respiration is under study. Since one of the main objects of the invention is the provision of a meter for respiration rate study, the invention will first be described in the context of such an application. Although as will become apparent, the meter of the present invention has other applications, some of which will be described in sufficient detail.

The meter also includes an acoustic cavity, hereafter also referred to as the microphone tube. One end of the tube extends into the gas flow conduit, in which an exciter element, such as wire, is located. When gas flows through the conduit, upon encountering the exciter wire, the gas flow around the wire becomes turbulent, producing a sound or an audio tone. The tone frequency is proportionately related to the gas flow rate.

The tone propagates through the microphone tube to its opposite end, outside the gas flow conduit. A microphone with a diaphragm is located at this end to respond to the tone and to supply a signal to an output unit as a function of the amplitude and frequency of the tone. The output unit may include a signal display device, such as an oscilloscope, and/or a signal recorder such as a tape recorder.

The novel features of the invention are set forth with particularity in the appended claims. The invention will best be understood from the following description when read in conjunction with the accompanying drawings.

BRIEF DESCRIPTION OF THE DRAWINGS

FIG. 5 is a simplified diagram of respiration rate application of the present invention; and FIG. 6 is a block and waveform diagram of an example of a signal conditioning arrangement.

DESCRIPTION OF THE PREFERRED EMBODIMENTS

Figure 1:
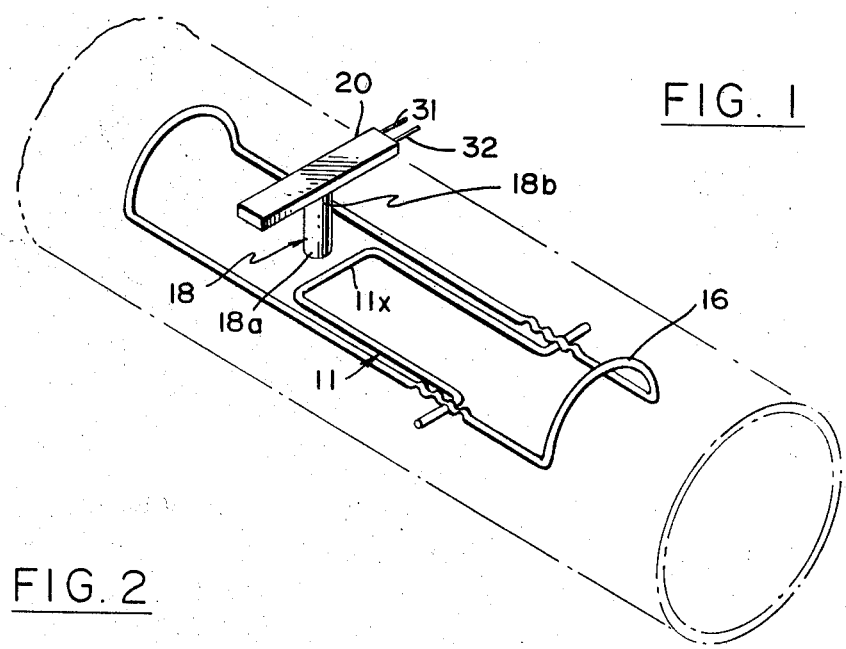
FIG. 1 is an expanded view of several basic components of the novel meter of the present invention.
Figure 2:
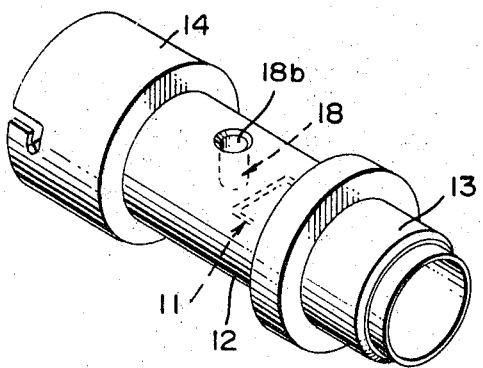
FIGS. 2, 3 and 4 are perspective views of one embodiment of the invention, actually reduced to practice, at different stages of construction.

Reference is now made to FIGS. 1 and 2 wherein numeral 11 designates an exciter wire which is supported in a case or conduit 12 supporting couplers 13 and 14 on its opposite sides. The couplers are used to connect the conduit 12 in series with conduits (not shown) through which flows the gas, whose flow rate is to be measured or sensed. The wire 11 is adjustably supported in conduit 12 by a support structure 16 (FIG. 1).

Figure 3:
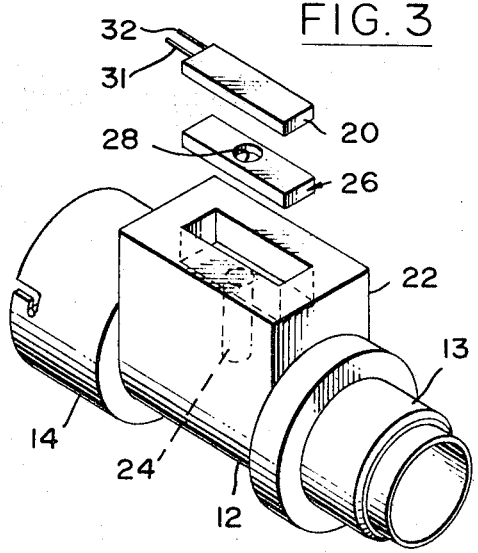
Figure 4:
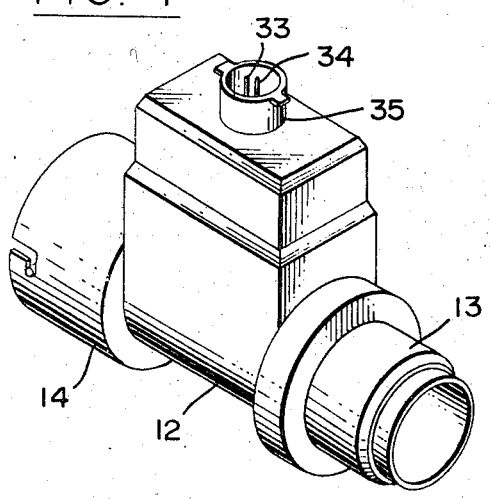

In a particular arrangement, shown in FIG. 1, this wire 11 is U-shaped, and supported by structure 16 at its two legs, while its top section 11x is shown located near one end 18a of an acoustic or microphone tube 18. The tube 18 extends to the exterior of conduit 12 with its other end, 18b, located adjacent a diaphragm of a microphone 20. As embodied in the example, diagrammed in FIGS. 3 and 4, the tube 18 extends from conduit 12 through a housing 22 which defines an internal channel 24. Housing 22 is used to support the microphone 20 over channel 24. Preferably, the microphone is also supported in housing 22 by a shock mount 26 which defines an aperture 28, which is in communication with the channel 24 and therethrough with acoustic tube 18. Leads 31 and 32 (FIGS. 1 and 3) extending from the microphone 20 are connected to pins 33 and 34 (FIG. 4) of a miniature plug 35, mounted on housing 22, to facilitate the supply of the microphone output to an appropriate output unit.

In operation, gas at low pressure and rate enters conduit 12 at one end and exits through the other. As it passes by and over exciter wire 11 gas turbulence is produced thereat, giving rise to an audio tone or sound. The tone frequency and amplitude are proportionately related to the gas flow rate. The tone is carried through the acoustic tube 18, channel 24 in housing 22, and aperture 28 in the shock mount 26 to the diaphragm of microphone 20, which is aligned therewith. The microphone output signal is thus related to the gas flow.

In one embodiment of the invention a small, commercially available, ceramic type microphone was incorporated. Therewith, gas flow as low as 0.5 liter per second was sensed. In this particular embodiment the length of the acoustic cavity 18 and the relative position of end 11x of exciter wire 11 were controlled so that the tone's predominant frequency and therefore the microphone's output frequency varied from 2 kHz. to 2.5 kHz. for flow rates varying from 0.5 liter per second to 5 liters per second, respectively. The amplitude of the microphone output signal was logarithmic varying from 10 millivolts to 50 millivolts peak to peak as gas flow increased from 0.5 liter per second to 5 liters per second, respectively.

It should be appreciated that the output of the microphone may be utilized in different ways, one of which includes the study of the respiration rate of a pilot. In such an application the conduit 12 is connected in series in the pilot's air or oxygen supply line between the oxygen source and the pilot's breathing mask. Such an arrangement is diagrammed in the simplified arrangement shown in FIG. 5 to which reference is made herein. In FIG. 5 the source and mask are designated by numerals 36 and 37 respectively. During each inspiratory cycle of the pilot a burst of oxygen passes through conduit 12. When an oxygen burst encounters the exciter wire 11 the oxygen flow around it becomes turbulent giving rise to a tone burst. The tone burst propagates through the acoustic tube 18 to the microphone 20, which in turn produces a burst of output signals, each burst representing one inspiratory cycle of the pilot or any other subject whose respiration rate is studied. The burst of the output signals of the microphone may be supplied directly to a display device, such as an oscilloscope, to visually observe the inspiratory cycles, thereby determining the pilot's respiration rate.

However, if the output signals have to be recorded on a low-speed magnetic-tape recorder, due to the frequencies of the output signals, it may be necessary to condition the signals prior to recordation. Signal conditioning may also be performed in order to improve signal-to-noise ratio, which is important particularly due to the high audio noise level inside a jet aircraft. Signal conditioning should also be performed whenever long, shallow inspiratory cycles or breaths may have to be sensed since in response to such breaths, the microphone output signal level may be too low to be recorded without some amplification.

Signal conditioning may be accomplished, for example, by the arrangement diagrammed in FIG. 6 to which reference is made herein. Therein the microphone output represented by plug 35 and designated by waveforms 41 and 42 is shown supplied to a high gain amplifier 44, whose output represented by waveform 41a and 42a is supplied to a half wave rectifier 46. The passband of the amplifier is limited in order to filter out noise. Assuming that the frequencies of the microphone signals may vary from 2 kHz. to about 3 kHz. the amplifiers passband may be limited to 1.7 kHz. to 3.5 kHz., with a mid-band gain of several hundred, such as 500. Thus, the effect of noise is greatly reduced. The function of the half wave rectifier is to pass only the positive portions of the amplified signals to an integrator 48 whose output is in turn supplied to a utilization unit such as a tape recorder 50. The outputs of the rectifier 46 and integrator 48 are represented by waveforms 41b, 42b and 41c and 42c, respectively.

In the particular diagrammed example, the integrator 48 is assumed to have a fast discharge time constant. Consequently, several input pulses for the microphone are required to produce a meaningful output for the integrator. At the end of each burst of signals from the microphone, the integrator's output is discharged to zero in a very short time for example 100 milliseconds, affording additional filtering of the microphone output and providing further protection from noise spikes. As is appreciated for a comparison of waveforms 41 and 42 with waveforms 41c and 42c, respectively, the output of the integrator consists of signals at frequencies considerably lower than the frequencies of the microphone output, which greatly facilitate the recording of such lower frequency signals on a low-speed tape recorder. In one particular embodiment, actually reduced to practice the signal conditioning arrangement of FIG. 6 required only approximately 12 milliwatts of power which, as is appreciated by those familiar with the art, is a very low power consumption.

As previously indicated, the novel meter of the present invention may be used in applications other than respiration rate studies. The meter, for example, can be used most advantageously to measure gas flow rate. In such an application the amplifier 44 would be chosen to have a passband which includes the lowest and highest frequencies which may be expected in response to the lowest and highest flow rates which have to be sensed. The output amplitude of the amplifier 44 would not be constant, as is the case in the respiration rate application. Rather, the output amplitude would be proportionately related to the input frequency which is in turn proportionately related to the gas flow rate. Also, the integrator 48 would be chosen to have a sufficiently long time constant to integrate the signals supplied thereto over a desired interval, such as one second. Thus the amplitude of the integrator output would represent the flow of gas through conduit 12. Knowing the gas pressure and the conduit size the total volume of gas flowing through the meter during such an interval is easily determined.

It should further be pointed out that although heretofore, the invention has been described mostly in terms of gas flow, the meter is similarly useful to measure flow rates of liquids, and therefore the term fluid should be deemed to include both gas and liquid matter.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fluid flow meter of the type, connectable between a source of fluid and fluid utilizing means, for sensing low rates of fluid flow at low fluid pressure, the meter comprising:

an elongated conduit connected to said source and said fluid utilizing means for providing a path for said fluid to flow therethrough;

exciter means positioned in the path of fluid flow in said conduit and including an exciter wire having a portion which is free to vibrate therein as a result of turbulence of fluid thereabout, for producing an acoustic signal which is a function of rate of fluid flow; and output means including signal-responsive means for producing an electrical signal which is a function of said acoustic signal which is created by the fluid turbulence, said output means further including a microphone positioned exterior to said conduit, and an acoustic tube having one end in said conduit adjacent said exciter wire and defining a space therebetween and an opposite end adjacent said microphone whereby an acoustic signal produced by said exciter wire propagates through said tube to said microphone which provides an output signal proportionately related to said acoustic signal.

2. The fluid flow meter as recited in claim 1 wherein the acoustic signal has a frequency and amplitude related to the rate of fluid flow, and said acoustic signal sensing element is a microphone having a frequency response range corresponding to the expected frequency range of said acoustic signal.

3. The fluid flow meter as recited in claim 2 wherein said output means includes signal conditioning means responsive to the microphone output for conditioning said output and for recording the conditioned output.

4. The fluid flow meter as recited in claim 3 wherein said fluid is gas, passing through said conduit in bursts, each burst producing a multicycle acoustic signal of a frequency and amplitude proportionately related to the rate of gas flow of the burst, said signal conditioning means including an integrator for providing a single-cycle signal in response to the microphone output produced as a function of each burst of gas flow.

5. A gas flow meter, of the type connected between a gas source and a gas utilizing means to which the gas is supplied as separate distinct bursts, for sensing low rates of gas flow at low pressure comprising:

a chamber connected in series between said source and said gas utilizing means for providing a path for said gas to flow therethrough along its longitudinal axis;

an acoustic path-defining member extending in a direction substantially perpendicular to said longitudinal axis and having a first end in said chamber and a second end opposite said first end exterior of said chamber and defining a cavity therebetween, for providing a path for a tone generated at said first end to propagate to said second end;

an adjustably positionable exciter wire supported in said chamber adjacent said member's first end, and separated therefrom for encountering gas flowing through said chamber to produce gas turbulence which generates an acoustic tone of a frequency and amplitude related to the gas flow rate;

a microphone fixedly positioned at the member's second end and responsive to the acoustic tone propagating through said member to provide an alternating-current output signal at a frequency and amplitude proportionately related to the tone's frequency and amplitude; and utilizing means for utilizing the microphone's output to provide an indication of gas flow.

6. The gas flow meter as recited in claim 5 wherein said utilizing means include a recorder and signal conditioning means disposed between said microphone and said recorder for conditioning the output signal of said microphone prior to its recordation by said recorder.

7. The gas flow meter as recited in claim 5 wherein said utilizing means include integrating means for integrating the output signal of said microphone provided in response to each burst of gas to provide a single pulse in response thereto.

8. The gas flow meter as recited in claim 6 wherein the output signal of said microphone in response to each burst is a multicycle signal, said utilizing means including a half wave rectifier for inhibiting a selected half of each cycle, said utilizing means further including an integrator, for integrating the uninhibited half cycles to provide a single pulse in response to each burst of gas flowing through said chamber.

References Cited
UNITED STATES PATENTS

| | | | |
|---|---|---|---|
| 1,215,135 | 2/1917 | Fisher | 73—194(vib.) |
| 3,273,389 | 9/1966 | Waugh | 73—194(vib.) |
| 2,492,371 | 12/1949 | Sivian | 73—194(vib.) |

OTHER REFERENCES

Swirlmeter (model SG-1), manufactured by the American Standard Corp., technical description.

JAMES J. GILL, Primary Examiner

M. SMOLLAR, Assistant Examiner